(12) United States Patent
Hawes

(10) Patent No.: US 6,850,264 B2
(45) Date of Patent: Feb. 1, 2005

(54) EDGE DETECTION APPARATUS AND METHOD

(75) Inventor: William R Hawes, Herts (GB)

(73) Assignee: Fujifilm Electronic Imaging Limited, Herts (GB)

(*) Notice: Subject to any disclaimer, the term of this patent is extended or adjusted under 35 U.S.C. 154(b) by 0 days.

(21) Appl. No.: 10/354,260

(22) Filed: Jan. 28, 2003

(65) Prior Publication Data

US 2004/0145648 A1 Jul. 29, 2004

(51) Int. Cl.⁷ .............................................. G01B 11/00
(52) U.S. Cl. ................................. 347/264; 250/559.16
(58) Field of Search ................................. 347/229, 248, 347/250, 262, 264; 250/559.01, 559.02, 559.11, 559.16, 559.29, 559.36

(56) References Cited

U.S. PATENT DOCUMENTS

| 6,038,028 A | * | 3/2000 | Grann et al. ................ 356/630 |
| 6,435,641 B1 | * | 8/2002 | Tung et al. .................... 347/16 |
| 6,566,670 B1 | * | 5/2003 | Buisker et al. ........ 250/559.36 |

* cited by examiner

Primary Examiner—Huan Tran
(74) Attorney, Agent, or Firm—Sughrue Mion, PLLC

(57) ABSTRACT

An edge detection apparatus for detecting an edge on a surface. The apparatus comprises a source of coherent radiation for generating a radiation beam and directing the beam onto the surface. A radiation detector is located so as to detect radiation diffusely reflected, but not specularly reflected, from the surface. A system is provided for causing relative scanning movement between the radiation beam and the surface. A monitor is coupled to the detector for monitoring the intensity of the detected radiation.

22 Claims, 1 Drawing Sheet

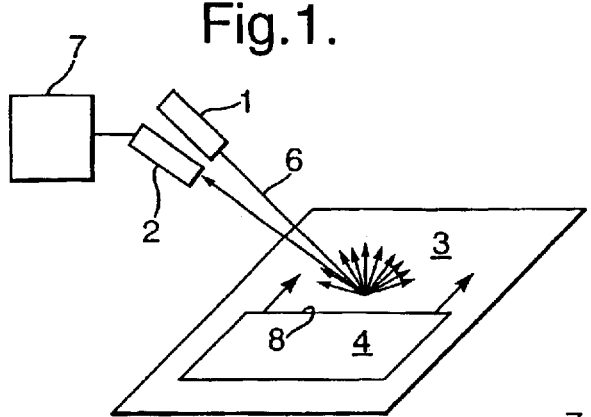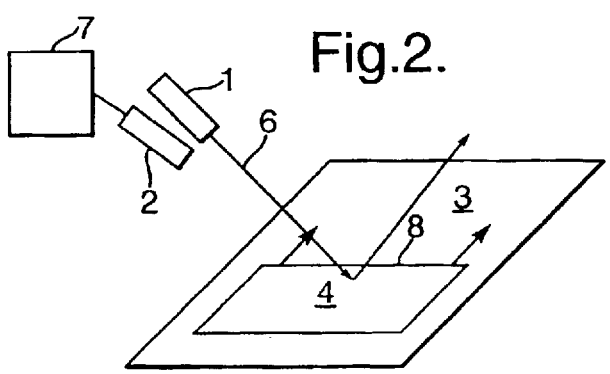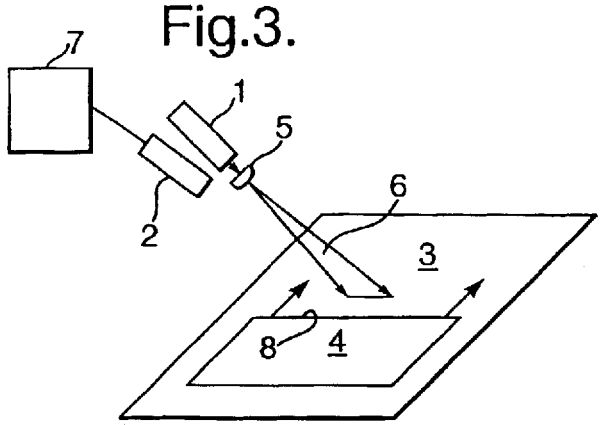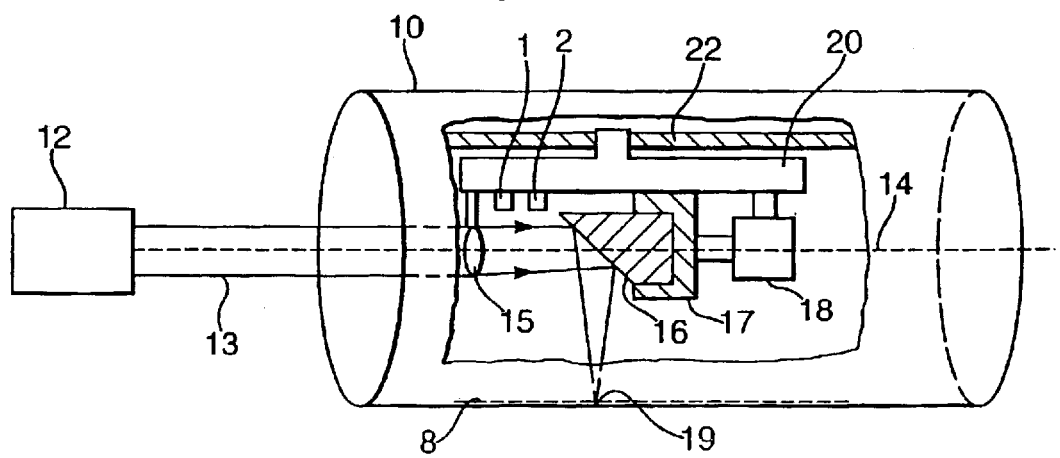

EDGE DETECTION APPARATUS AND METHOD

FIELD OF THE INVENTION

The invention relates to edge detection apparatus and a method for detecting an edge on a surface.

BRIEF DESCRIPTION OF THE PRIOR ART

Edge detectors are implemented in a wide variety of fields for detecting the position of objects such as sheets on transport media in photocopiers, imaging devices and other industrial processes. Typically, these involve the use of LEDs and photodetectors arranged on the opposite sides of a transport path. Alternatively, mechanical positioning devices are used such as movable guides and the like to locate an object without detecting its position.

In the field of high resolution imaging, these known devices are not sufficiently accurate to locate the position of recording media such as photographic film and photographic plates as are commonly used in imagesetters and the like. In these applications, it is necessary to achieve positioning to a resolution of at least 30 microns, and preferably 10 microns in computer to plate machines.

SUMMARY OF THE INVENTION

In accordance with a first aspect of the present invention, an edge detection apparatus for detecting an edge on a surface comprises a source of radiation for generating a radiation beam and directing the beam onto the surface; a radiation detector located so as to detect radiation diffusely reflected, but not specularly reflected, from the surface; a system for causing relative scanning movement between the radiation beam and the surface; and a monitor coupled to the detector for monitoring the intensity of the detected radiation.

In accordance with a second aspect of the present invention, a method of detecting an edge on a surface comprises causing relative scanning movement between the surface and a radiation beam impinging on the surface; and detecting radiation at a location at which diffusely reflected radiation, but not specularly reflected radiation, from the surface will be received.

We have devised a new apparatus and method which, in the case of imagesetter applications, avoids the need physically to align an object and does not use conventional optical edge detectors by taking advantage of the reflective properties of many objects. Thus, typically a surface on which an object is carried will be more diffusely reflective than the object and by locating the detector so as to detect diffusely reflected radiation but not specularly reflected radiation, a change in intensity will be monitored when the scanned beam moves from the surface onto the object. Thus, the edge of the object can be detected and its location used subsequently as necessary. For example, in an imagesetter, the imaging radiation can be directed onto the object or record medium utilizing the known location of the edge of the medium.

As the beam scans from the surface onto the object, more radiation will be specularly reflected so that the intensity of radiation received by the detector will decrease and by comparing this intensity with a threshold, the location of the edge can be determined.

The radiation beam may have a circular cross-section but preferably has a non-circular cross-section which has the effect of averaging the light reflected back over a larger area. This helps to suppress the modulation of the light by the texture of the surface and object on the surface and any small defects in the edge of an object on the surface while still maintaining a rapid transition over the edge.

The non-circular cross-section could be created by a variety of known optical arrangements but is conveniently achieved using a cylindrical lens.

Typically, the non-circular cross-section will define an elongate or linear dimension which extends transverse to the scanning direction, preferably substantially orthogonal to that direction.

This beam is preferably coherent and is generated for example by a laser.

The apparatus and method can be utilized in a variety of applications as explained above but an important application is an imagesetter including a support onto which a sensitive recording medium is positioned in use for exposure to an imaging beam; an expose optical system mounted on a carriage for exposing the medium to the imaging beam, the support of the edge detection apparatus defining the surface.

The imagesetter could be an internal or external drum imagesetter, a flatbed device or the like.

The edge detection apparatus could be mounted on a stationary support but conveniently is mounted on the carriage of the imagesetter. This not only helps to locate the optical systems in one location but also enables the beam from the source to be easily scanned by movement of the carriage.

Preferably, the source of the edge detection apparatus generates radiation at a wavelength different from that generated by the optical system for exposing the record medium. This avoids any risk of exposing the record medium during the edge detection process although in alternative arrangements, a relatively weak beam could be used which would otherwise expose the record medium, the beam intensity being less than the exposure threshold of the record medium.

A variety of record media could be used such as one of photographic film, polyester plate, photosensitive paper, and aluminium plate.

Conveniently, the surface is designed to be a good diffuse reflector and in the preferred example is made of anodized aluminium.

BRIEF DESCRIPTION OF THE DRAWINGS

Some examples of apparatus and methods according to the invention will now be described with reference to the accompanying drawings, in which:—

FIG. 1 is a schematic, perspective view illustrating an example of the apparatus before an edge is detected;

FIG. 2 is a view similar to FIG. 1 but after an edge has been detected;

FIG. 3 is a view similar to FIG. 1 but of a second example; and,

FIG. 4 is a schematic view of an imagesetter utilizing the apparatus of FIGS. 1 and 2 or FIG. 3.

DETAILED DESCRIPTION OF THE EXAMPLES

In the example shown in FIGS. 1 and 2, a laser 1 generates a coherent laser beam 6 which is directed towards a surface 3. As shown in FIG. 1, this surface 3 exhibits both specular and diffuse reflection. A radiation detector 2 such as a photodiode is positioned relative to the surface 3 and the source 1 such that specular reflection from the surface 3 will not be received by the detector 2.

Placed on the surface 3 is an imaging medium 4 such as a photographic film, polyester plate, aluminium plate or the like which is being directed along the surface 3 either by movement of the surface 3 or by a feed device (not shown). This latter arrangement would be adopted in the case of an imagesetter, for example, where the surface 3 would be fixed relative to the source 1 and detector 2 and the recording plate 4 fed along the surface.

In view of the reflective properties of the recording plate 4, when it intersects the beam 6 (FIG. 2) the beam will be substantially fully specularly reflected by the plate 4 and thus little or no radiation will be received by the detector 2.

The intensity of radiation detected by the detector 2 is monitored by a monitoring unit 7 which compares the detected intensity with a preset threshold. When the intensity falls below the threshold, this is flagged by the monitor 7 and is used by an imaging system (not shown) to record the location of the leading edge 8 of the plate 4 for use in subsequent imaging.

It will be noted that in this and the other examples, the apparatus is immune to variations in the specular reflective performance of the record medium 4 as can occur if curved edges and the like are present.

FIG. 3 illustrates a modified example in which the beam from the laser 1 is fed to a cylindrical lens 5 which forms the beam so that it has a linear cross-section arranged generally parallel to the leading edge 8 of the plate 4, thus orthogonal to the relative scanning movement between the beam 6 and plate 4. As mentioned above, spreading the beam into a line has the effect of averaging the light reflected back from the surface over a larger area. This helps to suppress the modulation of the light by the surface texture of the media, the back surface and any small defects in the media edge while still maintaining a rapid transition over the edge.

The incorporation of the apparatus of FIGS. 1 and 2 or FIG. 3 into an imagesetter will now be described with reference to FIG. 4. In FIG. 4, an anodized aluminium drum 10 carries a plate or film 8 to be exposed on its inner surface. A laser 12 generates a collimated, image modulated, laser beam 13 which is directed along the axis 4 of the drum 10. The laser beam 13 is reflected by a spinning mirror 16 onto the film 8. The beam 13 is focused into a spot 19 by a focusing lens 15. The rotating mirror 16 is typically a beryllium mirror which is mounted in a mirror mounting 17 and spun at approximately 30,000 rpm by a drive 18. As the film is exposed, items 15–18 are driven along the axis 14 of the drum 10. Thus the spot 19 follows a series of azimuthal scan lines across the film 8.

The lens 15, mirror mounting 17, and drive 18, are all mounted on a carriage 20 suspended from a lead screw 22. Rotation of the lead screw 22 will cause the carriage 20 to traverse parallel with the axis 14.

As can be seen in FIG. 4, the laser 1 and detector 2 are also mounted to the carriage 20 and positioned so as to detect the plate or film 8 as the carriage moves along the axis of the drum 10.

Typically, the wavelength of the beam generated by the source 1 will be chosen so as not to cause exposure of the film or plate 8. Conventionally, the beam generated by the source 12 will have wavelengths around 405 nm while the wavelength of the beam generated by the source 1 will be around 670 nm.

What is claimed is:

1. An edge detection apparatus for detecting an edge on a surface, the apparatus comprising a source of radiation for generating a radiation beam and directing the beam onto the surface; a radiation detector located so as to detect radiation diffusely reflected, but not specularly reflected, from the surface; a system for causing relative scanning movement between the radiation beam and the surface; and a monitor coupled to the detector for monitoring the intensity of the detected radiation, wherein the source is adapted to generate a radiation beam with a non-circular cross-section.

2. Apparatus according to claim 1, wherein the source includes a cylindrical lens for generating the non-circular cross-section of the beam.

3. Apparatus according to claim 1, wherein the cross-section has an elongate dimension which extends transverse to the scanning direction.

4. Apparatus according to claim 3, wherein the elongate dimension extends substantially orthogonally to the scanning direction.

5. Apparatus according to claim 1, wherein the cross-section has an elongate dimension which extends substantially parallel with an edge to be detected.

6. Apparatus according to claim 1, wherein the radiation beam is coherent.

7. Apparatus according to claim 6, wherein the source includes a laser.

8. An imagesetter including a support onto which a sensitive recording medium is positioned in use for exposure to an imaging beam; an expose optical system mounted on a carriage for exposing the medium to the imaging beam; and an edge detection apparatus according to claim 1, the support defining the said surface.

9. An imagesetter according to claim 8, wherein the edge detection apparatus is mounted on the carriage.

10. An imagesetter according to claim 8, wherein the source of the edge detection apparatus generates radiation at a wavelength different from that generated by the optical system for exposing the record medium.

11. An edge detection apparatus for detecting an edge on a surface, the apparatus comprising a source of radiation for generating a radiation beam and directing the beam onto the surface: a radiation detector located so as to detect radiation diffusely reflected, but not specularly reflected, from the surface: a system for causing relative scanning movement between the radiation beam and the surface; and a monitor coupled to the detector for monitoring the intensity of the detected radiation, the apparatus further comprising a movable transport defining the surface, the system for causing relative scanning movement comprising a transport drive motor.

12. A method of detecting an edge on a surface, the method comprising causing relative scanning movement between the surface and a radiation beam impinging on the surface; and detecting radiation at a location at which diffusely reflected radiation, but not specularly reflected radiation, from the surface will be received, wherein the radiation beam has a non-circular cross-section.

13. A method according to claim 12, wherein the cross-section has an elongate dimension which is arranged transverse to the scanning direction.

14. A method according to claim 13, wherein the elongate dimension is arranged substantially orthogonal to the scanning direction.

15. A method according to claim 12, wherein the cross-section has an elongate dimension which extends substantially parallel with an edge to be detected.

16. A method according to claim 12, wherein the radiation beam is coherent.

17. A method according to claim 12, wherein the surface carries an object which is more specularly reflective than the surface.

18. A method according to claim 17, wherein the object comprises a record medium sensitive to imaging radiation.

19. A method according to claim 18, wherein the object comprises one of photographic film, polyester plate, photo-sensitive paper, and aluminium plate.

20. A method according to claim 19, wherein the surface comprises anodized aluminium.

21. A method according to claim 18, wherein the radiation beam is defined by wavelengths to which the record medium is not sensitive.

22. A method according to claim 21, wherein the radiation beam defines wavelengths in the red part of the electromagnetic spectrum.

* * * * *